(12) United States Patent
Linzer

(10) Patent No.: US 8,396,119 B1
(45) Date of Patent: Mar. 12, 2013

(54) DATA SAMPLE COMPRESSION AND DECOMPRESSION USING RANDOMIZED QUANTIZATION BINS

(75) Inventor: Elliot N. Linzer, Suffern, NY (US)

(73) Assignee: Ambarella, Inc., Santa Clara, CA (US)

( * ) Notice: Subject to any disclaimer, the term of this patent is extended or adjusted under 35 U.S.C. 154(b) by 545 days.

(21) Appl. No.: 12/570,104

(22) Filed: Sep. 30, 2009

(51) Int. Cl.
*H04N 7/12* (2006.01)
*H04N 7/36* (2006.01)
*H04N 11/02* (2006.01)
*H04N 5/52* (2006.01)

(52) U.S. Cl. ......... 375/240.03; 375/240.02; 375/240.18; 375/240.28

(58) Field of Classification Search ............. 375/240.03, 375/240.18, 240.28
See application file for complete search history.

(56) References Cited

U.S. PATENT DOCUMENTS

| | | | | |
|---|---|---|---|---|
| 5,101,452 A | * | 3/1992 | Tsai et al. ................. | 382/268 |
| 5,553,200 A | * | 9/1996 | Accad ..................... | 358/1.9 |
| 6,373,894 B1 | * | 4/2002 | Florencio et al. ......... | 375/240.19 |
| 2002/0175857 A1 | * | 11/2002 | Abraham .................. | 342/357.12 |
| 2003/0206583 A1 | * | 11/2003 | Srinivasan et al. ........ | 375/240.01 |
| 2004/0228502 A1 | * | 11/2004 | Bradley et al. ............. | 382/100 |
| 2007/0201553 A1 | * | 8/2007 | Shindo ..................... | 375/240.03 |
| 2008/0055651 A1 | * | 3/2008 | Wei ............................. | 358/3.13 |

* cited by examiner

*Primary Examiner* — David Czekaj
*Assistant Examiner* — On S Mung
(74) *Attorney, Agent, or Firm* — Christopher P. Maiorana, PC

(57) ABSTRACT

A method for compressing data samples using randomized quantization bins is disclosed. The method generally comprises steps (A) to (C). Step (A) may generate a size signal having a quantization step size corresponding to the data samples in an input signal using a compression circuit. The data samples generally reside in a range of numbers. Step (B) may generate the randomized quantization bins in the range based on a pseudorandom process. Step (C) may generate a plurality of quantized samples in a compressed signal by quantizing the data samples based on the randomized quantization bins.

22 Claims, 8 Drawing Sheets

TABLE I

| SAMPLE | ORIGINAL VALUE (X) | QUANTIZED VALUE (Q) | DEQUANTIZED VALUE (R) | ERROR (R-X) |
|---|---|---|---|---|
| 1 | 100 | 12 | 100 | 0 |
| 2 | 101 | 12 | 100 | -1 |
| 3 | 102 | 12 | 100 | -2 |
| 4 | 103 | 12 | 100 | -3 |
| 5 | 104 | 13 | 108 | 4 |
| 6 | 105 | 13 | 108 | 3 |
| 7 | 106 | 13 | 108 | 2 |
| 8 | 107 | 13 | 108 | 1 |
| 9 | 108 | 13 | 108 | 0 |
| 10 | 109 | 13 | 108 | -1 |
| 11 | 110 | 13 | 108 | -2 |
| 12 | 111 | 13 | 108 | -3 |
| 13 | 112 | 14 | 116 | 4 |
| 14 | 113 | 14 | 116 | 3 |
| 15 | 114 | 14 | 116 | 2 |
| 16 | 115 | 14 | 116 | 1 |
| 17 | 116 | 14 | 116 | 0 |
| 18 | 117 | 14 | 116 | -1 |
| 19 | 118 | 14 | 116 | -2 |
| 20 | 119 | 14 | 116 | -3 |
| 21 | 120 | 15 | 124 | 4 |
| 22 | 121 | 15 | 124 | 3 |
| 23 | 122 | 15 | 124 | 2 |
| 24 | 123 | 15 | 124 | 1 |
| 25 | 124 | 15 | 124 | 0 |
| 26 | 125 | 15 | 124 | -1 |
| 27 | 126 | 15 | 124 | -2 |
| 28 | 127 | 15 | 124 | -3 |
| 29 | 128 | 16 | 132 | 4 |
| 30 | 129 | 16 | 132 | 3 |
| 31 | 130 | 16 | 132 | 2 |
| 32 | 131 | 16 | 132 | 1 |
| 33 | 132 | 16 | 132 | 0 |
| 34 | 133 | 16 | 132 | -1 |
| 35 | 134 | 16 | 132 | -2 |
| 36 | 135 | 16 | 132 | -3 |
| 37 | 136 | 17 | 140 | 4 |
| 38 | 137 | 17 | 140 | 3 |
| 39 | 138 | 17 | 140 | 2 |

FIG. 1

CONVENTIONAL

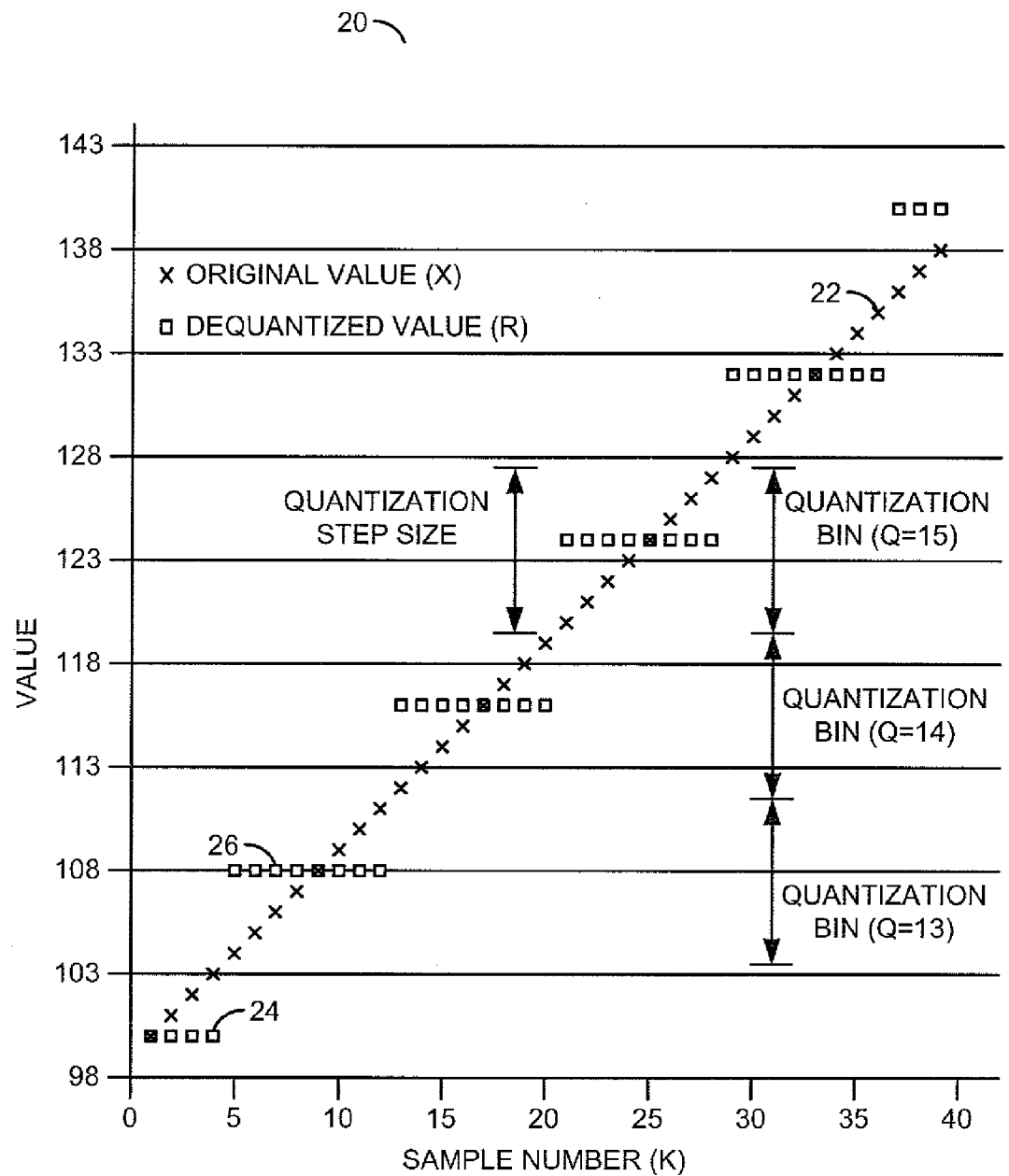
FIG. 2
CONVENTIONAL

TABLE II

| SAMPLE (K) | ORIGINAL VALUE (X) | RANDOM NUMBER | QUANTIZED VALUE (Q) | DEQUANTIZED VALUE (R) | ERROR (R-X) |
|---|---|---|---|---|---|
| 1 | 100 | 1 | 12 | 101 | 1 |
| 2 | 101 | 1 | 12 | 101 | 0 |
| 3 | 102 | -1 | 12 | 99 | -3 |
| 4 | 103 | 2 | 12 | 102 | -1 |
| 5 | 104 | -2 | 13 | 106 | 2 |
| 6 | 105 | -2 | 13 | 106 | 1 |
| 7 | 106 | -4 | 13 | 104 | -2 |
| 8 | 107 | 1 | 13 | 109 | 2 |
| 9 | 108 | 0 | 13 | 108 | 0 |
| 10 | 109 | -2 | 13 | 106 | -3 |
| 11 | 110 | -4 | 14 | 112 | 2 |
| 12 | 111 | -1 | 14 | 115 | 4 |
| 13 | 112 | 3 | 13 | 111 | -1 |
| 14 | 113 | -3 | 14 | 113 | 0 |
| 15 | 114 | 3 | 13 | 111 | -3 |
| 16 | 115 | -1 | 14 | 115 | 0 |
| 17 | 116 | 0 | 14 | 116 | 0 |
| 18 | 117 | 2 | 14 | 118 | 1 |
| 19 | 118 | 0 | 14 | 116 | -2 |
| 20 | 119 | 2 | 14 | 118 | -1 |
| 21 | 120 | -2 | 15 | 122 | 2 |
| 22 | 121 | 3 | 14 | 119 | -2 |
| 23 | 122 | 1 | 15 | 125 | 3 |
| 24 | 123 | -4 | 15 | 120 | -3 |
| 25 | 124 | -1 | 15 | 123 | -1 |
| 26 | 125 | -2 | 15 | 122 | -3 |
| 27 | 126 | 2 | 15 | 126 | 0 |
| 28 | 127 | 0 | 15 | 124 | -3 |
| 29 | 128 | -3 | 16 | 129 | 1 |
| 30 | 129 | 3 | 15 | 127 | -2 |
| 31 | 130 | -4 | 16 | 128 | -2 |
| 32 | 131 | 3 | 16 | 135 | 4 |
| 33 | 132 | -2 | 16 | 130 | -2 |
| 34 | 133 | -1 | 16 | 131 | -2 |
| 35 | 134 | -2 | 17 | 138 | 4 |
| 36 | 135 | -2 | 17 | 138 | 3 |
| 37 | 136 | -1 | 17 | 139 | 3 |
| 38 | 137 | 0 | 17 | 140 | 3 |
| 39 | 138 | 0 | 17 | 140 | 2 |

FIG. 6

TABLE III

| SAMPLE (K) | ORIGINAL VALUE (X) | RANDOM NUMBER | QUANTIZED VALUE (Q) | DEQUANTIZED VALUE (R) | ERROR (R-X) |
|---|---|---|---|---|---|
| 1 | 60 | -2 | 7 | 58 | -2 |
| 2 | 60 | -4 | 8 | 64 | 4 |
| 3 | 60 | -1 | 7 | 59 | -1 |
| 4 | 60 | 3 | 7 | 63 | 3 |
| 5 | 60 | -3 | 7 | 57 | -3 |
| 6 | 60 | 3 | 7 | 63 | 3 |
| 7 | 60 | -1 | 7 | 59 | -1 |
| 8 | 60 | 0 | 7 | 60 | 0 |
| 9 | 60 | 2 | 7 | 62 | 2 |
| 10 | 60 | 0 | 7 | 60 | 0 |
| 11 | 60 | 2 | 7 | 62 | 2 |
| 12 | 60 | -2 | 7 | 58 | -2 |
| 13 | 60 | 3 | 7 | 63 | 3 |
| 14 | 60 | 1 | 7 | 61 | 1 |
| 15 | 60 | -4 | 8 | 64 | 4 |
| 16 | 60 | -1 | 7 | 59 | -1 |

FIG. 8

DATA SAMPLE COMPRESSION AND DECOMPRESSION USING RANDOMIZED QUANTIZATION BINS

FIELD OF THE INVENTION

The present invention relates to a method and/or architecture for data compression generally and, more particularly, to data sample compression and decompression using randomized quantization bins.

BACKGROUND OF THE INVENTION

Conventional lossy compression schemes use quantization to reduce a bit-rate of data samples. Quantization is commonly used to compress (i) original pulse code modulated samples of a signal, (ii) transform coefficient samples of images (i.e., JPEG, MPEG and H.264) and (iii) differential pulse code modulated samples of a signal. Input data samples subjected to quantization and then inverse quantization often result in output data samples that are different from the input data samples. The differences are typically the only lossy part of lossy compression schemes.

The subjective loss of quality caused by the quantization does not depend only on an absolute difference between the decompressed samples and the original (pre-compressed) samples. For example, if the compression causes many adjacent samples to have identical values after decompression, artificial contours can appear in the decompressed signal.

Referring to FIG. 1, a Table I illustrating an example conventional quantization and dequantization of data samples is shown. Using a step size of 8, the quantization of an original sample X is calculated as $Q=floor(X/8)$. A decoder using a dequantization offset of 4 will decode a quantized value of Q with the formula $R=Q \times 8+4$, where R is the dequantized data sample.

An error range between the original samples X and the dequantized samples R is [−3, 4]. Table I shows that for random original values X, the errors of −3, −2, −1, 0, 1, 2, 3 and 4 have a similar probability. Therefore, the average absolute error in the example is $(|-3|+|-2|+|-1|+|0|+|1|+|2|+|3|+|3|+|4|)/8=2$.

Referring to FIG. 2, a graph 20 of the data in Table I is shown. When the above example quantization scheme is applied to a slowly varying signal, the quantization may lead to abrupt jumps in the decompressed signal. In the example, X increases by 1 each step along a line 22. A first set of samples X are quantized and dequantized to a first value R=100, as indicated by reference 24. A second set of samples X are quantized and dequantized to a second value R=108, as indicated by reference 26, and so on. As can be seen from the graph 20, the values R have abrupt jumps that create a staircase like effect. The staircase like effect can have unfavorable consequences. For example, if the signal being compressed is image data, the jumps in the values of R will appear as visible contours in the decompressed picture, even though the original picture had no such contours.

It is desirable to have a lossy compression scheme that does not cause sharp contours in the decompressed signal.

SUMMARY OF THE INVENTION

The present invention concerns a method for compressing data samples using randomized quantization bins. The method generally comprises steps (A) to (C). Step (A) may generate a size signal having a quantization step size corresponding to the data samples in an input signal using a compression circuit. The data samples generally reside in a range of numbers. Step (B) may generate the randomized quantization bins in the range based on a pseudorandom process. Step (C) may generate a plurality of quantized samples in a compressed signal by quantizing the data samples based on the randomized quantization bins.

The objects, features and advantages of the present invention include providing a method and apparatus for data sample compression and decompression using randomized quantization bins that may (i) minimize sharp contours in a decompressed signal, (ii) be adapted to existing compression techniques, (iii) be adapted to existing decompression techniques, (iv) randomize quantization bins based on time, (v) randomize quantization bins based on spatial positions and/or (vi) randomize quantization bins based on frequency-domain positions.

BRIEF DESCRIPTION OF THE DRAWINGS

These and other objects, features and advantages of the present invention will be apparent from the following detailed description and the appended claims and drawings in which:

FIG. 1 is a Table I illustrating an example conventional quantization and dequantization of data samples;

FIG. 2 is a graph of the data in Table I;

FIG. 6 is a Table II illustrating an example quantization and dequantization of data samples using randomized quantization bins;

FIG. 8 is a Table III illustrating an example quantization and dequantization of static data samples.

DETAILED DESCRIPTION OF THE PREFERRED EMBODIMENTS

A pseudorandom process is generally used to randomize quantization bins used in both a quantization process and a dequantization (inverse quantization) process. The randomization of the quantization bins may prevent sequences of slowly-varying data sample values from creating distinct contours in recovered sample values at the end of the dequantization process. Randomization of the quantization bins may be synchronized between a compression process and a decompression process such that for each given sample, both processes utilize a same randomized quantization bin to operate on the given samples. The pseudorandom process generally establishes one or more sequences of pseudorandom values. Pairing of the data samples with the corresponding pseudorandom values may be based on one or more of temporal positions of the data samples, spatial positions of the data samples and/or frequency positions of the data samples (e.g., data samples are transform coefficients). The quantization process may be used to compress (i) original pulse code modulated samples of a signal, (ii) transform coefficient samples of images (e.g., JPEG, MPEG and H.264) and (iii) differential pulse code modulated samples of a signal.

Randomization of the quantization bins during compression may be achieved by adjusting the original data samples with corresponding pseudorandom values prior to quantization. For example, a quantized sample (e.g., Q) may be calculated as Q=floor((X−D1(K))/S), where X may be an original data sample, K may represent a temporal position, a spatial position and/or a frequence-domain position of sample X, D1(K) may be a pseudorandom value based on K, and S may represent a quantization step size. The function "floor(A/B)" may choose the largest integer that is not smaller than A/B (e.g., drop the fractional part). The randomization process effectively offsets the positions of the randomized quantization bins from the positions of the non-randomized quantization bin.

Randomization of the quantization bins during decompression may be achieved by adjusting decompressed samples with the corresponding pseudorandom values after dequantization. For example, a recovered sample (e.g., R) may be calculated as R=(S×Q)+C+D2(K), where C may be a constant offset and D2(K) may be a pseudorandom value based on K. In some embodiments, the pseudorandom values D1(K)=D2(K) for all values of K. In other embodiments, the pseudorandom values D1(K)≠D2(K). Other adjustments may be implemented to meet the criteria of a particular application.

Figure 3:
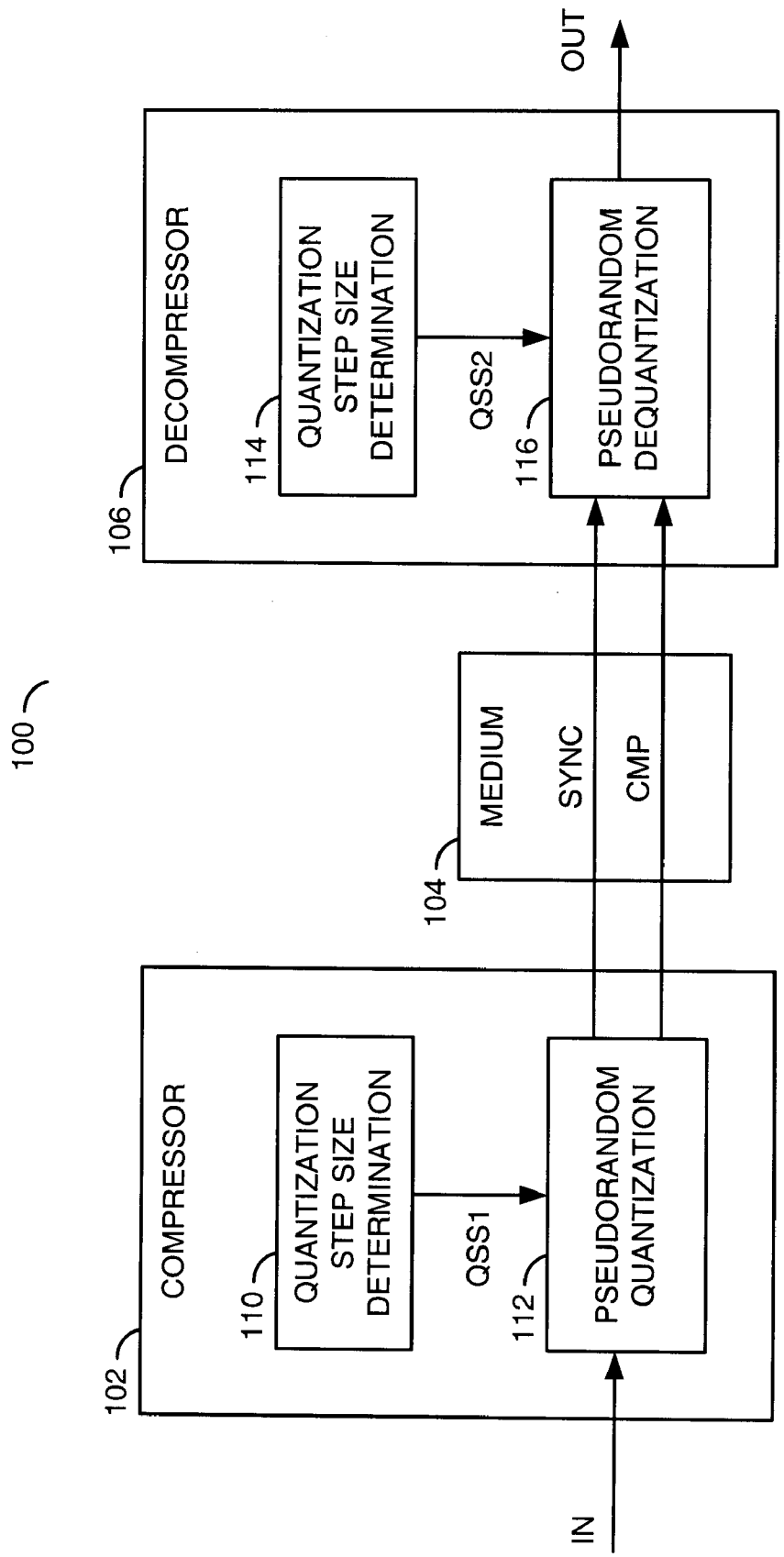
FIG. 3 is a block diagram of an example implementation of a system in accordance with a preferred embodiment of the present invention.

Referring to FIG. 3, a block diagram of an example implementation of a system 100 is shown in accordance with a preferred embodiment of the present invention. The system (or apparatus) 100 generally comprises a circuit (or module) 102, a medium 104 and a circuit (or module) 106. A signal (e.g., IN) having data samples may be received by the circuit 102. The circuit 102 may generate a signal (e.g., CMP) carrying compressed samples. The signal CMP may be presented from the circuit 102 through the medium 104 to the circuit 106. The medium 104 may also carry an optional synchronization signal (e.g., SYNC) from the circuit 102 to the circuit 106. A signal (e.g., OUT) carrying recovered data samples may be generated by the circuit 106. The circuits 102 and 106 may be implemented in hardware, software, firmware or any combination thereof.

The circuit 102 may implement a compression circuit (or process). The circuit 102 is generally operational to compress the data samples X received in the signal IN to create the quantized samples Q in the signal CMP. Compression generally involves quantization of the data samples X using randomized quantization bins. Regular quantization bins may cover a range of possible data sample values. The pseudorandom quantization bins may be adjusted relative to the regular quantization bins. In an example embodiment, the adjustment may be implemented as a subtraction of the pseudorandom values from the data sample values prior to the "floor" function. For example, a quantized sample Q may be calculated from a data sample X as Q=floor((X−D1(K))/S). Other adjustments may be implemented to meet the criteria of a particular application.

The circuit 102 may also be operational to generate the signal SYNC. The signal SYNC may be used to keep the pseudorandom process operating the circuit 106 aligned with the pseudorandom process operating in the circuit 102. When the circuit 102 initializes or reinitializes the local pseudorandom process to an initial state (or condition), the signal SYNC may be asserted in an active state with a first data sample X to use a predetermined (e.g., first) pseudorandom value.

In some embodiments, the signal SYNC may be explicitly transferred through the medium 104. For example, the circuit 102 may transmit the signal SYNC in the active state just before or simultaneously with the transmission of the first quantized sample Q into the medium 104. The circuit 106 may respond by initializing/reinitializing the local pseudorandom process such that the first received quantized sample Q is processed with the same predetermined pseudorandom value.

In other embodiments, the signal SYNC may be implied by the quantized samples Q. For example, both the circuit 102 and the circuit 106 may initialize/reinitialize the respective pseudorandom processes upon the start of each frame, field, group of pictures, slice, line, block, sub-block or other boundary naturally associated with the data samples X. Other mechanisms that align the pseudorandom process in the circuit 102 with the pseudorandom process in the circuit 106 may be implemented to meet the criteria of a particular application. In some embodiments, the two pseudorandom processes may not be synchronized with each other.

The medium 104 may implement a transmission and/or storage medium. The medium 104 is generally operational to store and/or transfer the quantized samples Q in the signal CMP from the circuit 102 to the circuit 106. The medium 104 may also be operational to store and/or transfer the signal SYNC from the circuit 102 to the circuit 106. The medium 104 may include, but is not limited to, coaxial transmission lines, fiber optics, optical disks, magnetic disks, radio-frequency channels, solid state memories (e.g., dynamic random access memory) and the like.

The circuit 106 may implement a decompression circuit (or process). The circuit 106 is generally operational to decompress the quantized samples Q received in the signal CMP to create the recovered samples R in the signal OUT. Decompression generally involves dequantization of the quantized samples Q using the randomized quantization bins. The pseudorandom quantization bins may be adjusted from regular quantization bins that may cover a range of possible data sample values. In an example embodiment, the adjustment may be implemented as an addition of the pseudorandom values to the recovered samples. For example, the recovered samples R may be calculated as R=(S×Q)+C+D2(K).

The circuit 106 may also be operational to synchronize the local pseudorandom process with the pseudorandom process in the circuit 102. Synchronization may be based on the signal SYNC. In some embodiments, the circuit 106 may explicitly receive the signal SYNC through the medium 104. Upon detection that the signal SYNC has been asserted to the active state, the circuit 106 may initialize/reinitialize the internal pseudorandom process to the initial state (or condition). In other embodiments, the signal SYNC may be implied by the quantized samples Q, as explained above. Therefore, the circuit 106 may be operational to detect the start of a frame, start of a field, start of a group of pictures, start of a slice, start of a new line, start of a block, start of a sub-block or other boundary. Once the appropriate start has been detected, the circuit 106 may restart the local pseudorandom process and align the resulting sequence of pseudorandom values with the corresponding quantized samples. In the example illustrated in FIG. 2, each sample generally has the same possible reconstructed values of 4, 12, 20, 28, etc. Using the system 100, the possible reconstructed values generally vary from sample to sample in a pseudorandom manor.

The circuit 102 generally comprises a circuit (or module) 110 and a circuit (or module) 112. The circuit 112 may receive the signal IN. The signal IN may be received through an input port of the circuit 102. A signal (e.g., QSS1) may be generated by the circuit 110 and transferred to the circuit 112. The circuit 112 may generate the signal SYNC and the signal CMP. The signal SYNC may be presented to the medium 104 through an output port of the circuit 102. The signal CMP may be presented to the medium 104 via an output port of the circuit 102. The circuits 110 and 112 may be implemented in hardware, software, firmware or any combination thereof.

The circuit 110 may implement a step size determination circuit. The circuit 110 is generally operation to determine one or more of the quantization step sizes S used to compress the data samples X. The quantization step sizes S may be presented in the signal QSS1. In some embodiments, a single quantization step size S may be determined for all of the data samples X. In other embodiments, multiple quantization step sizes S may be generated for the data samples X. In still other embodiment, the quantization step size S may be implemented as a quantization matrix having a different step size in each position of the matrix.

The circuit 112 may implement a pseudorandom quantization circuit. The circuit 112 is generally operational to generate the pseudorandom numbers, generate the signal SYNC (if explicit) and compress the data samples X to create the quantized samples Q in the signal CMP. Compression is generally based on both the quantization step size S and the pseudorandom numbers, as described above.

The circuit 106 generally comprises a circuit (or module) 114 and a circuit (or module) 116. The circuit 116 may receive the signal CMP via an input port of the circuit 106. The circuit 114 may receive the signal SYNC from the medium 104 through an input port of the circuit 106. A signal (e.g., QSS2) may be generated by the circuit 114 and transferred to the circuit 116. The signal OUT may be generated by the circuit 116. The signal OUT may be presented through an output port of the circuit 106. The circuits 114 and 116 may be implemented in hardware, software, firmware or any combination thereof.

The circuit 114 may implement a step size determination circuit. The circuit 114 is generally operation to determine one or more of the quantization step sizes S that were used by the circuit 102 to generate the quantized samples Q. The quantization step sizes S may be presented in the signal QSS2. In some embodiments, a single quantization step size S may be determined for all of the quantized samples Q. In other embodiments, multiple quantization step sizes S may be generated for the quantized samples Q. In still other embodiment, the quantization step size S may be implemented as a quantization matrix having a different step size in each position of the matrix.

The circuit 116 may implement a pseudorandom dequantization circuit. The circuit 116 is generally operational to generate a local sequence of pseudorandom numbers and decompress the quantized samples Q to create the recovered samples R in the signal OUT. Decompression is generally based on both the quantization step size S and the pseudorandom numbers, as described above.

Figure 4:
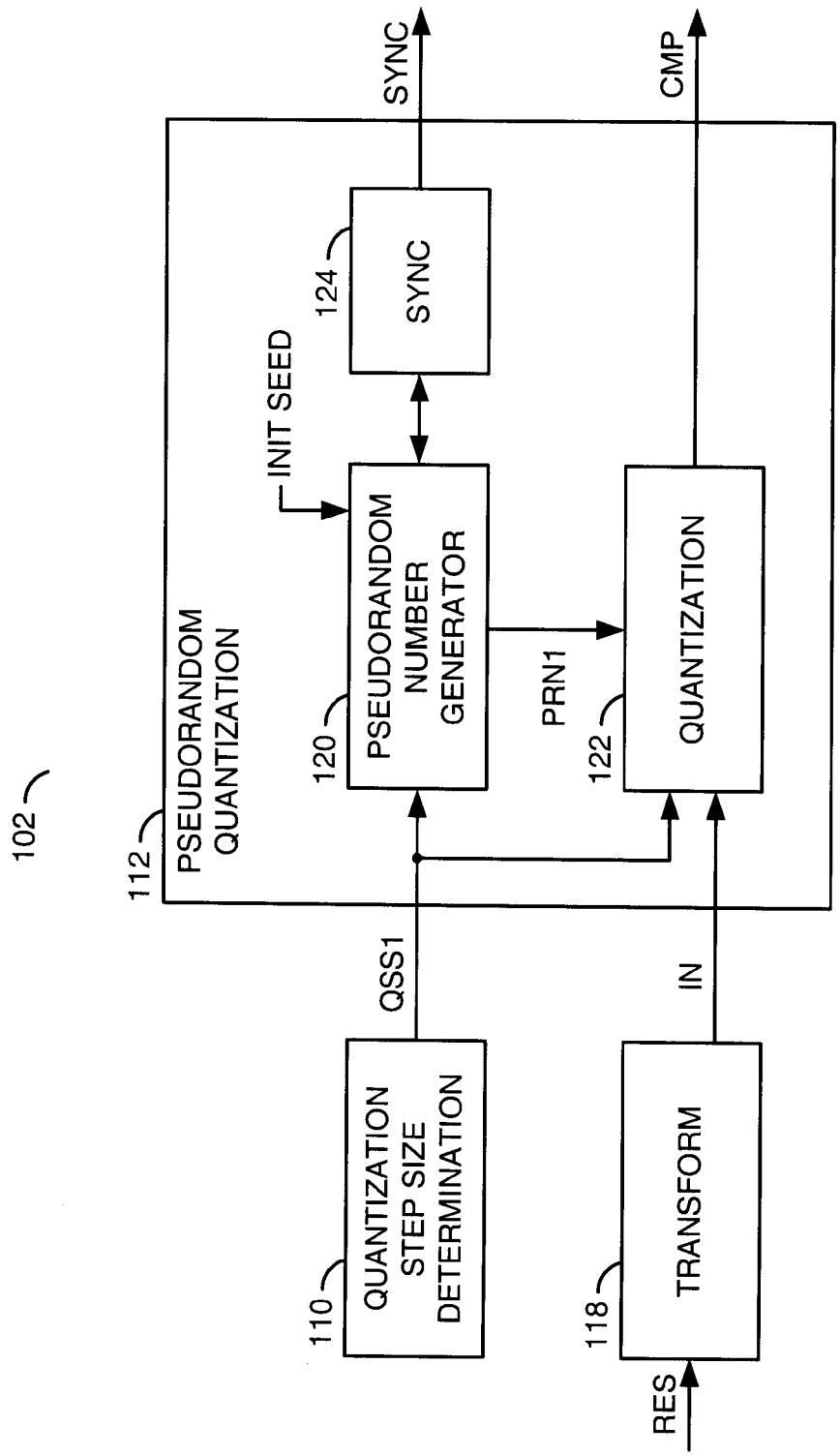
FIG. 4 is a block diagram of an example implementation of a portion of a compression circuit.

Referring to FIG. 4, a block diagram of an example implementation of a portion of the circuit 102 is shown. The circuit 102 may include the circuit 110, the circuit 112 and an optional circuit (or module) 118. A signal (e.g., RES) may be received by the circuit 118. The circuit 118 may generate the signal IN.

The circuit 118 may implement a transform circuit. The circuit 118 may be operational to perform a spatial-domain to frequency-domain transformation (e.g., a discrete cosine transform or an integer transform) that converts residual samples in the signal RES into the data samples (e.g., transform coefficients) in the signal IN. The circuit 118 is generally implemented in picture encoding systems where the signal RES carries video image or still image information. In some embodiments, the circuit 118 may not be implemented.

The circuit 112 generally comprises a circuit (or module) 120, a circuit (or module) 122 and a circuit (or module) 124. The signal QSS1 may be received by both the circuits 120 and 122. The signal IN may be received by the circuit 122. A signal (e.g., PRN1) may be generated by the circuit 120 and presented to the circuit 122. The circuit 124 may generate the signal SYNC. The circuit 122 may generate the signal CMP. The circuits 118, 120, 122 and 124 may be implemented in hardware, software, firmware or any combination thereof.

The circuit 120 may implement a pseudorandom number generator. The circuit 120 is generally operational to generate a sequence of pseudorandom numbers in the signal PSN1. An initial state (or condition) of the sequence may be determined by an initial seed value (e.g., INIT SEED). In some embodiments that include the circuit 118, multiple circuits 120 may be implemented, a respective circuit 120 for each of the frequency-domain positions of the transform coefficients generated by the circuit 118.

The circuit 122 may implement a quantization circuit. The circuit 122 is generally operational to quantize the data samples X received in the signal IN to generate the quantized samples Q in the signal CMP. The quantization may be performed per the randomized quantization bins. The circuit 122 may be operational to establish the randomized quantization bins based on the quantization step size S received in the signal QSS1 and the pseudorandom numbers received in the signal PRN1. In some embodiments, the randomization of the quantization bins may be achieved by subtracting the pseudorandom number from the data sample values according to $Q=\text{floor}((X-D1(K))/S)$, as described above.

The circuit 124 generally implements a driver circuit. The circuit 124 may be operational to generate the signal SYNC to mark a beginning of the pseudorandom number sequence generated by the circuit 120. The beginning of the pseudorandom number sequence may be based on a rest of the circuit 120 and/or sensing of an appropriate start condition. Assertion of the signal SYNC may be aligned with a first position in the pseudorandom number sequence.

Figure 5:
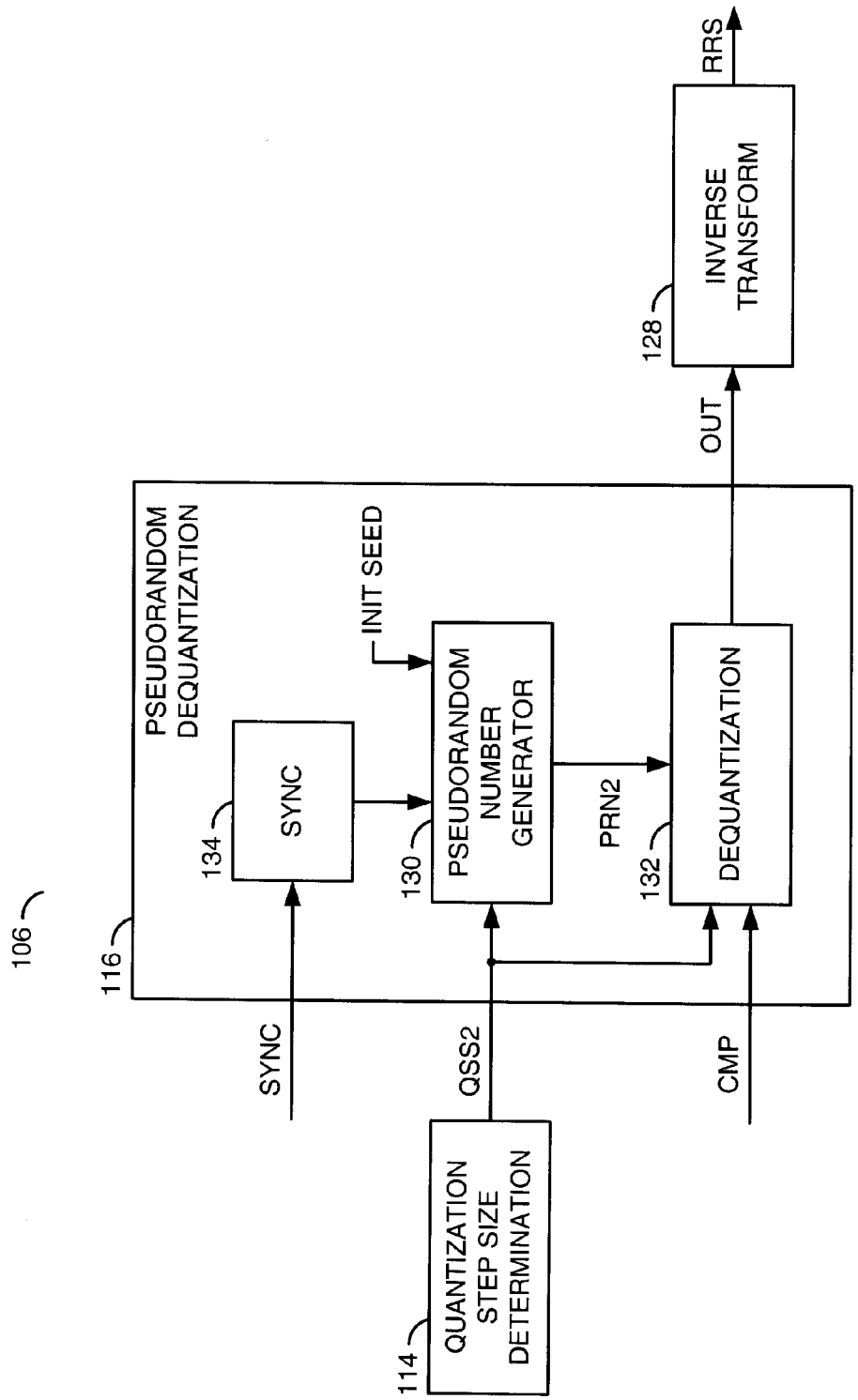
FIG. 5 is a block diagram of an example implementation of a portion of a decompression circuit.

Referring to FIG. 5, a block diagram of an example implementation of a portion of the circuit 106 is shown. The circuit 106 may include the circuit 114, the circuit 116 and an optional circuit (or module) 128. The signal OUT may be presented from the circuit 116 to the circuit 128. A signal (e.g., RRS) may be generated by the circuit 128.

The circuit 128 may implement an inverse transform circuit. The circuit 128 may be operational to perform a frequency-domain to spatial-domain inverse transformation (e.g., an inverse discrete cosine transform or an inverse integer transform) that converts the recovered samples (e.g., recovered transform coefficients) in the signal OUT into the recovered residual samples in the signal RRS. The circuit 128 is generally implemented in picture decoding systems where the signal RRS carries decoded video image information or decoded still image information. In some embodiments, the circuit 128 may not be implemented.

The circuit 116 generally comprises a circuit (or module) 130, a circuit (or module) 132 and a circuit (or module) 134. The signal QSS2 may be received by both the circuits 130 and 132. The signal CMP may be received by the circuit 132. A signal (e.g., PRN2) may be generated by the circuit 130 and presented to the circuit 132. The circuit 134 may receive the signal SYNC. The circuit 132 may generate the signal CMP. The circuits 128, 130, 132 and 134 may be implemented in hardware, software, firmware or any combination thereof.

The circuit 130 may implement a pseudorandom number generator. The circuit 130 is generally operational to generate a sequence of pseudorandom numbers in the signal PRN2. An initial state (or condition) of the sequence may be determined by an initial seed value. In some embodiments that include the circuit 128, multiple circuits 130 may be implemented, a respective circuit 130 for each of the frequency-domain positions of the transform coefficients generated by the circuit 118 (FIG. 4).

The circuit 132 may implement an inverse quantization circuit. The circuit 122 is generally operational to inverse quantize the quantized samples Q received in the signal CMP to generate the recovered samples R in the signal OUT. The dequantization may be performed using the randomized quantization bins. The circuit 132 may be operational to establish the randomized quantization bins based on the quantization step size S received in the signal QSS2 and the pseudorandom numbers received in the signal PRN2. In some embodiments, the randomization of the quantization bins may be achieved by adding the pseudorandom number to the recovered samples according to $R=(S \times Q)+C+D2(K)$, as described above.

The circuit 134 generally implements a receiver circuit. The circuit 134 may be operational to trigger the circuit 130 to initialize/reinitialize upon detecting an assertion of the signal SYNC and/or sensing of an appropriate start condition. Triggering of the circuit 134 may align the pseudorandom process in the circuit 134 with the pseudorandom process in the circuit 120 such that both circuits 122 and 132 use the same random number to quantize and inverse quantize a particular sample.

Referring to FIG. 6, a Table II illustrating an example quantization and dequantization of data samples using randomized quantization bins is shown. In the example, (i) the sequence of pseudorandom values (e.g., D(K)) used to compress generally matches the pseudorandom sequence used to decompress (e.g., $D(K)=D1(K)=D2(K)$), (ii) a range of the pseudorandom numbers may be $[-4, 3]$ peak-to-peak (e.g., spans the quantization step size S), (iii) the quantization step size S may have a value of 8 and (iv) the constant C may have a value of 4. Compression may be given as $Q=\text{floor}((X-D(K))/8)$. Decompression may be given as $R=(Q+8)+4+D(K)$. Table II generally shows that an error for each sample is within the range $[-3, 4]$, and the average absolute error is 2.

Figure 7:
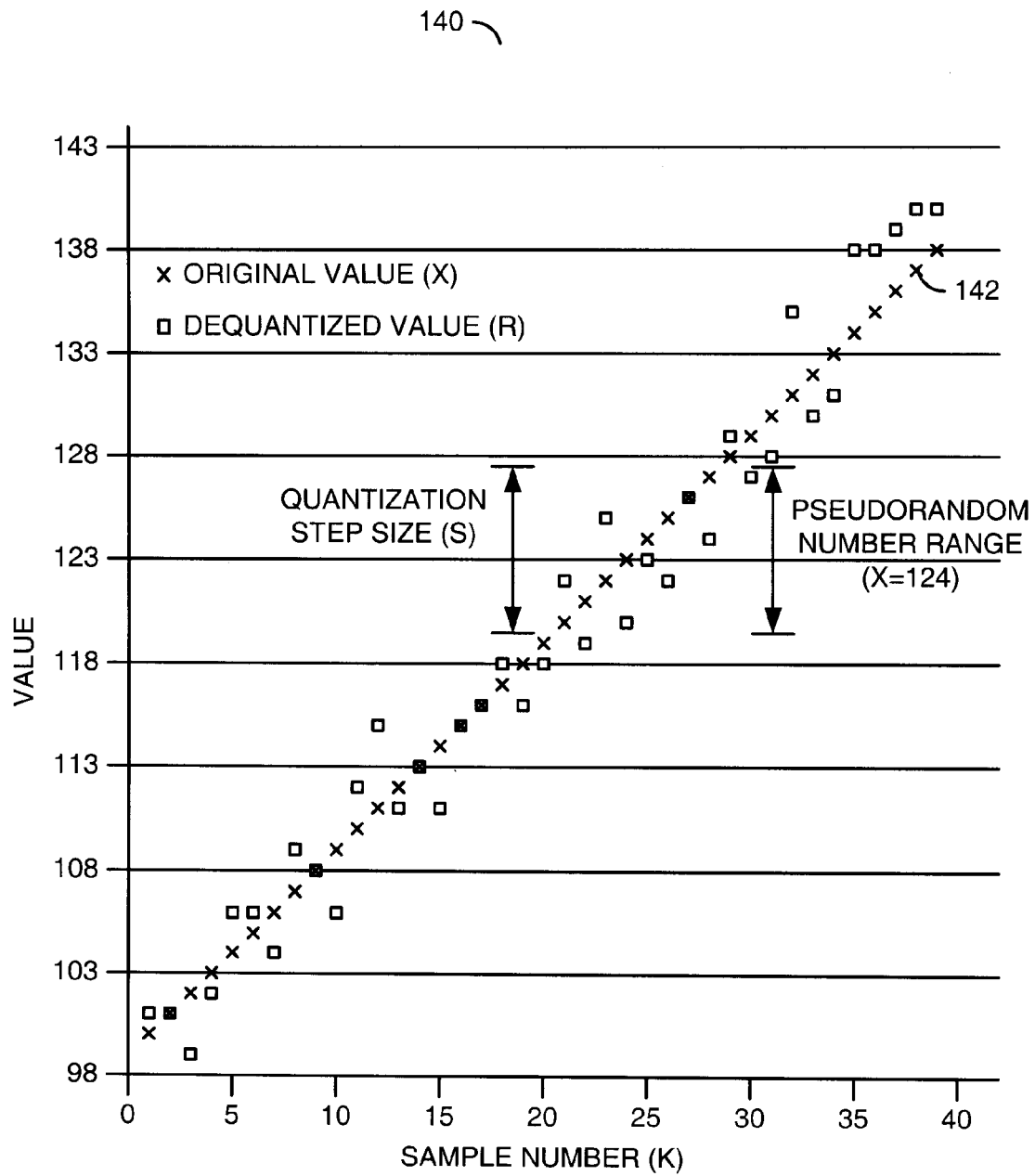
FIG. 7 is a graph of the data in Table II.

Referring to FIG. 7, a graph 140 of the data in Table II is shown. As may be seen in the graph 140, the recovered samples R generally do not create a contoured (e.g., staircase) pattern, as seen in FIG. 2. Instead, the quantization and dequantization generally add unpatterned pseudorandom noise to the original signal 142. A range of the pseudorandom numbers may match the quantization step size S. For example, a data sample X of 124 may be randomized to a value within a range of 121 to 128 (e.g., $[-3, 4]$).

The pseudorandom numbers D(K) may be generated with a pseudorandom number process at the compression side and the decompression side. The same pseudorandom number generation process is preferably used for quantization (e.g., circuit 102) and dequantization (e.g., circuit 106). For example, the first row of Table II generally illustrates:
1. X=100 (original sample)
2. D=1 (pseudorandom number)
3. $Q=\text{floor}((X+D)/8)=\text{floor}(101/8)=\text{floor}(12.625)=12$ (quantized value)
4. $R=(Q \times 8)+4+D=101$ (dequantized value)

Where the pseudorandom value D(K) used in step 4 is the same as the pseudorandom value D(K) used in step 2 (e.g., the compression and decompression use the same pseudorandom number generation process), the pseudorandom number D(K) for sample K may be the same for both the compression and the decompression. Therefore, while the placements of quantization bins are randomized, the compressor and decompressor have matching bins for each sample.

Referring to FIG. 8, a Table III illustrating an example quantization and dequantization of static data samples is shown. The system 100 may randomize the quantization bins based on time. Table III generally illustrates that using a different pseudorandom number across multiple constant data samples (e.g., X=60) generally results in white noise in the recovered samples.

The range of the pseudorandom numbers generated by the circuits 120 and 130 generally match the quantization step size S. In the example shows in FIGS. 6 and 7, the pseudorandom numbers include 8 integers ranging from −4 to 3. The 8 integers of the example pseudorandom numbers generally match the example quantization step size of 8. In some embodiments, wider ranges of pseudorandom number may be generated. In other embodiments, narrower ranges of pseudorandom numbers may be generated. For example, in some implementations where the two pseudorandom processes in the circuits 120 and 130 are not synchronized, the pseudorandom range may be reduced to a fraction of the quantization step size S. In a worst case scenario, both circuits 120 and 130 may adjust a given sample in opposite directions using a largest magnitude pseudorandom number. For example, a maximum pseudorandom value of 2 subtracted from a data sample value of 124 in the compression generally results in $Q=\text{floor}((124-2)/8)=15$. In the decompression, an opposite pseudorandom value of −2 may be added to the dequantized sample resulting in $R=15 \times 8+4-2=122$. A resulting error (R−X) may be $124-122=2$.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for compressing data samples, comprising the steps of:
   (A) generating a size signal having a current one or more of a plurality of quantization step sizes corresponding to said data samples in an input signal using a compression circuit;
   (B) generating a plurality of intermediate samples by adjusting said data samples based on a pseudorandom process, wherein said pseudorandom process varies said adjusting of said data samples in response to said current quantization step size; and
   (C) generating a plurality of quantized samples in a compressed signal by quantizing said intermediate samples based on said current quantization step size;
   (D) generating a second size signal having said current quantization step size corresponding to said quantized samples in said compressed signal;
   (E) generating a plurality of second intermediate samples by inverse quantizing said quantized samples based on said current quantization step size; and
   (F) generating a plurality of decompressed samples in a decompressed signal by adjusting said second intermediate samples based on a second pseudorandom process, wherein said second pseudorandom process varies said adjusting of said second intermediate samples in response to said current quantization step size.

2. The method according to claim 1, wherein (i) said pseudorandom process comprises generating a plurality of pseudorandom values and (ii) a range of said pseudorandom values is based on said current quantization step size.

3. The method according to claim 2, wherein said pseudorandom process further comprises subtracting at least one of said pseudorandom values from at least one of said data samples.

4. The method according to claim 3, wherein a particular one of said pseudorandom values is subtracted from a particular one of said data samples based on at least one of (i) a temporal position and (ii) a spatial position of said particular data sample in said input signal.

5. The method according to claim 1, further comprising the step of:
   synchronizing said pseudorandom process in said compression circuit with said second pseudorandom process.

6. The method according to claim 1, wherein said data samples are from one of (i) a still image and (ii) a video image.

7. An apparatus comprising:
   a first circuit configured to generate a size signal having a current one or more of a plurality of quantization step sizes corresponding to a plurality of data samples of an input signal; and
   a second circuit configured to (i) generate a plurality of intermediate samples by adjusting said data samples based on a pseudorandom process and (ii) generate a plurality of quantized samples in a compressed signal by quantizing said intermediate samples based on said current quantization step size, wherein said pseudorandom process varies said adjusting of said data samples in response to said current quantization step size; and
   a third circuit configured to (i) generate a second size signal having said current quantization step size corresponding to said quantized samples in said compressed signal, (ii) generate a plurality of second intermediate samples by inverse quantizing said quantized samples based on said current quantization step size and (iii) generate a plurality of decompressed samples in a decompressed signal by adjusting said second intermediate samples based on a second pseudorandom process, wherein said second pseudorandom process varies said adjusting of said second intermediate samples in response to said current quantization step size.

8. The apparatus according to claim 7, wherein said pseudorandom process generates a plurality of pseudorandom values with a pseudorandom number generator in response to said current quantization step size.

9. The apparatus according to claim 8, wherein a peak-to-peak difference of said pseudorandom values is no greater than said current quantization step size.

10. The apparatus according to claim 8, wherein (i) said second circuit comprises a synchronization circuit configured to generate a synchronization signal and (ii) said synchronization signal aligns said pseudorandom values generated in said second circuit with said pseudorandom values generated in said third circuit.

11. The apparatus according to claim 7, further comprising a transform circuit configured to generate a plurality of transform coefficients, wherein (i) said data samples comprise said transform coefficients and (ii) said current quantization step size comprises a plurality of step sizes in a quantization matrix used by said second circuit to quantize said transform coefficients.

12. A method for decompressing quantized samples, comprising the steps of:
   (A) generating a size signal having a current one of more of a plurality of quantization step sizes corresponding to said quantized samples in a compressed signal using a decompression circuit;
   (B) generating a plurality of intermediate samples by inverse quantizing said quantized samples based on said current quantization step size; and (C) generating a plurality of decompressed samples in a decompressed signal by adjusting said intermediate samples based on a pseudorandom process, wherein said pseudorandom process varies said adjusting of said intermediate samples in response to said current quantization step size.

13. The method according to claim 12, wherein said pseudorandom process comprises generating a plurality of pseudorandom values based on said current quantization step size.

14. The method according to claim 13, wherein said pseudorandom process further comprises adding at least one of said pseudorandom values to at least one of said intermediate samples.

15. The method according to claim 13, wherein a particular one of said pseudorandom values is added to a particular one of said intermediate samples based on at least one of (i) a temporal position and (ii) a spatial position of said particular intermediate sample.

16. The method according to claim 12, further comprising the step of generating a plurality of data samples by inverse transforming said decompressed samples.

17. An apparatus comprising:
a first circuit configured to generate a size signal having a current one or more quantization step sizes corresponding to a plurality of quantized samples of a compressed signal; and
a second circuit configured to (i) generate a plurality of intermediate samples by inverse quantizing said quantized samples based on said current quantization step size and (ii) generate a plurality of decompressed samples in a decompressed signal by adjusting said intermediate samples based on a pseudorandom process, wherein said pseudorandom process varies said adjusting of said intermediate samples in response to said current quantization step size.

18. The apparatus according to claim 17, wherein said pseudorandom process comprises generating a plurality of pseudorandom values with a pseudorandom number generator in response to said current quantization step size.

19. The apparatus according to claim 18, wherein a peak-to-peak difference of said pseudorandom values is no greater than said current quantization step size.

20. The apparatus according to claim 18, wherein (i) said second circuit comprises a synchronization circuit configured to receive a synchronization signal, (ii) said synchronization signal aligns said pseudorandom values generated in said apparatus with said pseudorandom values generated in a compression circuit and (iii) said compression circuit is configured to generate said compressed signal.

21. The apparatus according to claim 17, further comprising an inverse transform circuit configured to generate a plurality of data samples by inverse transforming said decompressed quantized samples, wherein (i) said decompressed quantized samples comprise a plurality of transform coefficients and (ii) said current quantization step size comprises a plurality of step sizes in a quantization matrix used by said second circuit to inverse quantize said intermediate samples.

22. A method for compressing, comprising the steps of:
(A) generating a plurality of data samples by one of (i) a frequency-domain transformation and (ii) differential pulse code modulation of an input signal;
(B) generating a plurality of intermediate samples by adjusting said data samples based on a pseudorandom process, wherein said pseudorandom process is based on at least one of (i) a temporal position, (ii) a spatial position and (iii) a frequency-domain position of said data samples;
(C) generating a plurality of quantized samples in a compressed signal by quantizing said intermediate samples;
(D) generating a size signal having a current one of more of a plurality of quantization step sizes corresponding to said quantized samples in said compressed signal;
(E) generating a plurality of second intermediate samples by inverse quantizing said quantized samples based on said current quantization step size; and
(F) generating a plurality of decompressed samples in a decompressed signal by adjusting said second intermediate samples based on a second pseudorandom process, wherein said second pseudorandom process varies said adjusting of said second intermediate samples in response to said current quantization step size.

* * * * *